United States Patent
Werink et al.

(10) Patent No.: US 11,732,095 B2
(45) Date of Patent: Aug. 22, 2023

(54) CONCENTRATE FOR POLYESTER-BASED MATERIALS

(71) Applicant: Holland Colours N.V., Apeldoorn (NL)

(72) Inventors: Johan Jozef Marinus Werink, Apeldoorn (NL); Jules Caspar Albert Anton Roelofs, Apeldoorn (NL)

(73) Assignee: Holland Colours N.V., Apeldoorn (NL)

( * ) Notice: Subject to any disclaimer, the term of this patent is extended or adjusted under 35 U.S.C. 154(b) by 188 days.

(21) Appl. No.: 16/954,188

(22) PCT Filed: Dec. 17, 2018

(86) PCT No.: PCT/NL2018/050847
§ 371 (c)(1),
(2) Date: Jun. 15, 2020

(87) PCT Pub. No.: WO2019/117725
PCT Pub. Date: Jun. 20, 2019

(65) Prior Publication Data
US 2021/0139656 A1    May 13, 2021

(30) Foreign Application Priority Data
Dec. 15, 2017  (EP) .................................... 17207797

(51) Int. Cl.
C08J 3/22      (2006.01)
C08K 3/013     (2018.01)
C08K 3/22      (2006.01)

(52) U.S. Cl.
CPC ............... *C08J 3/226* (2013.01); *C08K 3/013* (2018.01); *C08K 3/22* (2013.01); *C08J 2367/02* (2013.01); *C08J 2423/20* (2013.01); *C08K 2003/2241* (2013.01)

(58) Field of Classification Search
CPC .... C08J 3/226; C08J 2367/02; C08J 2423/20; C08K 2003/2241
See application file for complete search history.

(56) References Cited

U.S. PATENT DOCUMENTS

| | | |
|---|---|---|
| 2009/0169786 A1 | 7/2009 | Dierick |
| 2012/0165422 A1 | 6/2012 | Vernon et al. |
| 2015/0041839 A1 | 2/2015 | Sakai |

FOREIGN PATENT DOCUMENTS

| | | |
|---|---|---|
| EP | 1 737 755 A1 | 1/2007 |
| EP | 2 024 433 A1 | 2/2009 |
| EP | 2 151 472 A1 | 2/2010 |
| JP | 2000-202972 A | 7/2000 |
| WO | 2007/058506 A1 | 5/2007 |
| WO | 2008-116796 A1 | 10/2008 |
| WO | 2008/116796 A1 | 10/2008 |
| WO | 2017/095931 A1 | 6/2017 |

OTHER PUBLICATIONS

International Search Report issued in PCT/NL2018/050847; dated May 3, 2019.
S.K. Kuriechen et al.; "Mineralization of Azo Dye Using Combined Photo-Fenton and Photocatalytic Processes under Visible Light"; Journal of Catalysts; vol. 2013; Article ID 104019; Apr. 4, 2013; pp. 1-6; Hindawi Publishing Corporation.
J.S. Peng et al.; "Generation kinetics of color centers in irradiated poly(4-methyl-1-pentene)"; Journal of Applied Physics; vol. 110; Issue 6; Sep. 27, 2011; pp. 063529 (1-5); AIP.
Unknown; "Material Safety Data Sheet Opaque White PET"; Penn Color, Inc.; Product Id: 66W4620; Sep. 26, 2013; pp. 1-8.

*Primary Examiner* — Edward J Cain
(74) *Attorney, Agent, or Firm* — Studebaker & Brackett PC

(57) ABSTRACT

The invention discloses a concentrate comprising polymethylpentene and titanium dioxide, a process for preparing polyester-based preforms and containers, a use of said concentrate, and a container product. The concentrate of the invention comprises 20-90% polymethylpentene, and 10-80% titanium dioxide, based on the weight of the concentrate.

21 Claims, 3 Drawing Sheets

CONCENTRATE FOR POLYESTER-BASED MATERIALS

CROSS-REFERENCE TO RELATED APPLICATIONS

This application is the U.S. National Stage of International Application No. PCT/NL2018/050847 filed Dec. 17, 2018, which claims benefit of priority to European Patent Application No. 17207797.6 filed Dec. 15, 2017, the entire contents of which are incorporated herein by reference.

The invention is directed to a concentrate comprising polymethylpentene and titanium dioxide, to a process for preparing polyester-based preforms and containers, to a use of said concentrate, and to a container product.

While natural polymers have been used by mankind for thousands of years, the industrial production of plastics during the twentieth century has changed the world.

The way synthetic polymers are constituted (e.g. chain length, unit arrangement, and type of units) contribute to their properties (e.g. lightweight, plasticity, and thermal and electrical insulating). These properties, as a consequence of the modular approach, have led to the unique position of synthetic polymeric material in ones every day life.

One example thereof is the use of plastics as packaging material. Polyethylene terephthalate (PET) is a common material used for example for manufacturing bottles, films, and microwavable packaging.

Standard PET packaging does not provide a light barrier in the ultraviolet (UV) and visible part of the electromagnetic spectrum in the wavelengths between 320-700 nm. Below 320 nm, PET absorbs light and thereby prevents light sensitive compounds to be affected by this light. While conventional PET bottles have little intrinsic light shielding, coloured PET on the other hand, has better light shielding.

Colourful PET packaging has been around for quite some time. Colouring plays an important role in drawing the attention of consumers to the product. Yet, colour can have a more practical function as well. For example, certain colours are used to protect light sensitive compounds from degradation as a result of exposure to UV and visible light. Examples of products that include such light sensitive compounds are dairy products, such as milk.

Therefore, a light barrier needs to be added to the conventional PET bottle to protect the content from degradation. This can for example be achieved by mixing a colorant into PET, or by putting a light protective film around a bottle—containing the pigment. Another way of protecting light sensitive compounds from degradation may be using a multi-layered bottle instead of a mono-layered one, for example comprising different (coloured) polymers.

Titanium dioxide ($TiO_2$) is a well-known pigment (whitening agent) with a high refractive index. The plastic industry is one of the largest users of titanium dioxide. The inorganic compound is applied because of its high covering power, whiteness, heat resistance, and weather resistance. In addition hereto, and in light of this invention, titanium dioxide contributes to whitening agent performance and light protection of plastic products. Despite the advantageous effects, the use of titanium dioxide also has drawbacks.

For example, incorporating titanium dioxide into PET packaging material significantly reduces, yet does not completely, eliminate light transmission. The presence of low to moderate levels of titanium dioxide still allows some light transmission in the critical visible light area. By incorporating high levels of titanium dioxide in packaging material (i.e. 4% or more, based on the total weight of the packaging), it has become possible to obtain an opaque material having a degree of transmission that is low enough to store dairy products for a sufficiently long period of time.

EP-A-1 737 755 reveals such a packaging material as described above. The material provides a reasonably good opacity and light protection of the contents. However, there is still need for improvement. For example, the processing property of the material is a drawback, as the material is relatively sensitive to delamination after blow moulding. The delamination occurs in the walls of the packaging, which results in decreased barrier properties and failure (breaking) of the package, especially under elevated pressure.

To decrease the transmission of the portions of UV and visible light that are detrimental to the shelf life of dairy products, additional light absorbing additives could be included. Examples thereof are (mixed) metal oxides, and carbon black, mentioned in EP-A-2 151 472 and EP-A-2 024 433. However, the presence of above-mentioned light absorbing additives shifts the packaging colour from white to greyish, which is not desired in the case of dairy containing packaging.

US-A-2009/0 169 786 states that titanium dioxide is used in a single PET layer, resulting in an opaque white PET layer. However, as disclosed therein, a large amount of pigment such as titanium dioxide or zinc sulphate has an adverse effect on production costs and the manufacturing process of preforms and end products. Therefore, US-A-2009/0 169 786 discloses a multi-layered preform for a container, wherein the dispersed phase consists of polymeric substances which are incompatible with the continuous PET phase. Titanium dioxide can then be omitted.

WO-A-2017/095931 expresses the need for light barrier compositions which can be manufactured in a form that exhibits an appealing visual appearance, are cost efficient, and result in lighter packaging materials. WO-A-2017/095931 discloses titanium dioxide free polymer blend compositions comprising PET and one or more other polymeric species, resulting in materials having a transmittance less than 1.5% at a spectrum of 400-700 nm. Wall thickness of the products was not disclosed.

US-A-2015/0 041 839 reveals electron beam curable resin compositions. A resin composition is disclosed comprising 47.5 wt. % of polymethylpentene and 21.4 wt. % of titanium dioxide. The resin compositions as disclosed in US-A-2015/0 041 839 are directly used as composite material.

Not only additives are and have been subject to debate, the positive image of plastics drastically declined when plastic debris was first observed in the Earth's oceans. Despite the superior attributes of plastics, some challenges are associated with these materials. For example, some plastics deteriorate in full sunlight, but require a long time to decompose by biodegradation. Therefore, the ecological impact that plastics have, has led to multiple recycling initiatives worldwide.

Plastics can be blended with recycled plastic without sacrificing properties in many applications. Plastic from bottles can be spun into fibre for the production of carpets, clothing or made into new bottles. However, the reuse of coloured plastics has the drawback that the colour will contaminate or negatively impact the mechanical and visual properties of the newly manufactured product or hamper the production thereof. An example of a coloured plastic is opaque PET. The presence of a high amount of titanium dioxide can result in fibre breakage during the spinning process of polyester.

The use of opaque PET in packaging has increased significantly in recent years. This plastic has been made opaque by the addition of certain pigments (e.g. above-mentioned titanium dioxide). However, as mentioned above, opaque PET can disrupt the recycling process into new bottles or polyester fibres, and does so already in the recycling industry value chain.

The presence of the pigment affects the colour and the reuse of recycled PET. In several nations, opaque PET has replaced high-density polyethylene (HDPE) for a variety of reasons. For example, opaque PET offers more flexibility in design of bottles appealing more to the customers wishes, the economics of production are more favourable (higher output per investment), and improved resealability of opened PET bottles.

The light protection property of PET bottles, for example, can be further extended by use of a multi-layered polyester structure. Multilayer bottles (e.g. a structure of PET with $TiO_2$/black layer (PET)/PET with $TiO_2$) do not result in light transmittance, however, the black layer (middle) shines through the bottle resulting in a grey appearance. In addition, the multilayer is relatively expensive and processing hereof is more difficult.

Two-layered structures are possible as well. Herewith, the bottle has a greyish layer on the inside and a white layer on the outside, which gives near complete protection against both UV and visible light. The use of high levels of mineral opacifiers, like titanium dioxide, caused a decreased lifespan of moulds for mono- and multi-layered structures, due to an increased abrasive wear of the equipment. Overcolouring of the grey layer requires a high amount of titanium dioxide.

Figure 1:
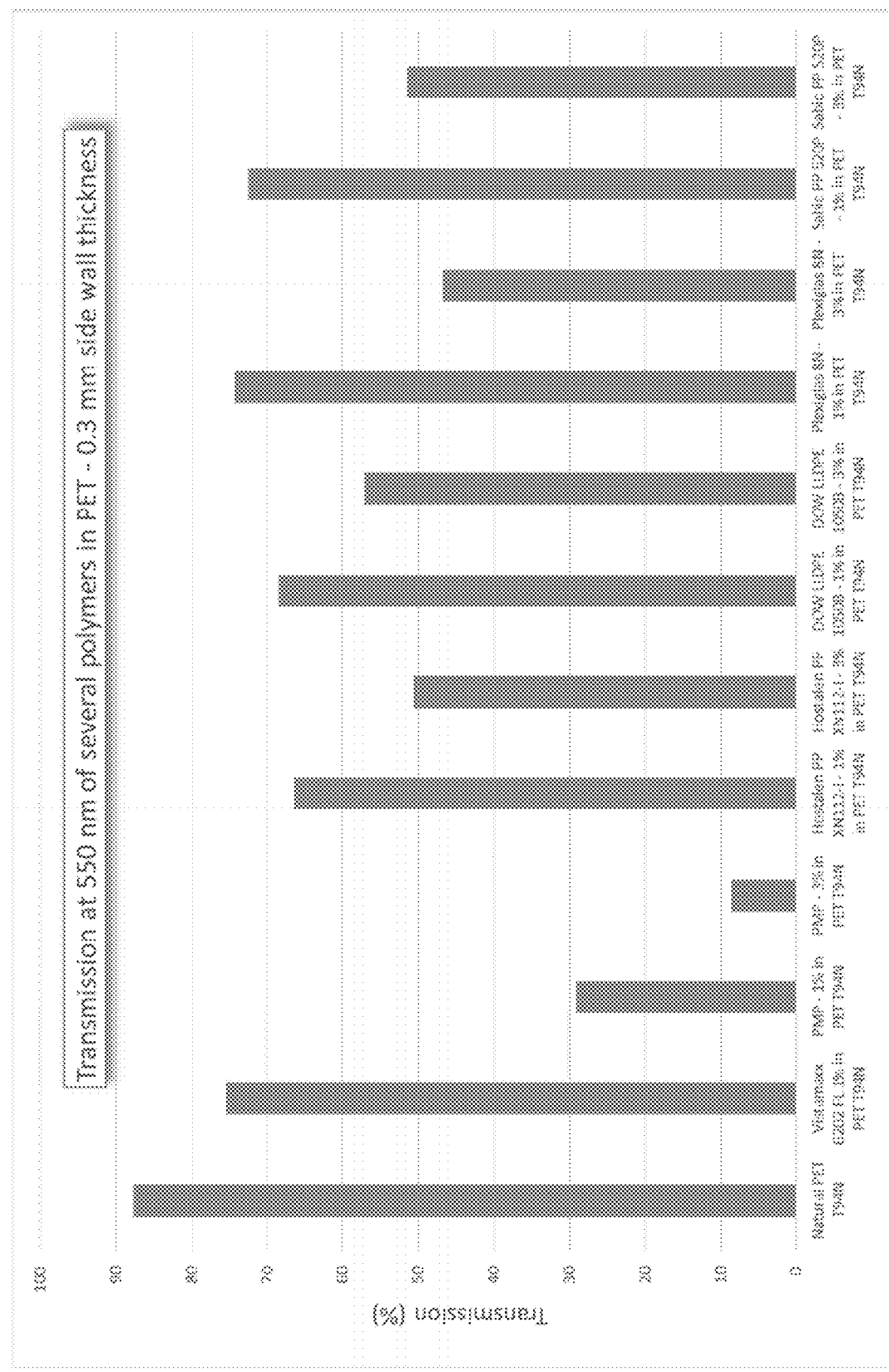
FIG. 1 depicts transmission at 550 nm of several polymers in PET—0.3 mm wall thickness.

Therefore, there is an industrial need to develop a manner to circumvent the loss in light protection when the content of mineral opacifying agents in PET containers will be below 4% by total weight, and maintaining a white appearance. In addition, there is a need to develop a manner with which the life span of moulds for multilayer packaging producers is extended. Furthermore, weight reduction and lower raw material costs as well as production costs are considered to be industrial needs for coloured PET containers.

An objective of the invention is to overcome one or more of the disadvantages faced in the prior art.

A further objective of the invention is to provide a concentrate wherewith polyester preforms and/or containers can be manufactured containing less than 4% by total weight of titanium dioxide, without significantly reducing the light protection and white appearance.

Yet a further objective of the invention is to provide a concentrate with which polyester preforms and/or containers can be manufactured having a reduced weight and lower raw material as well as production costs, without significantly reducing the light protection and white appearance.

Yet a further objective of the invention is to provide a concentrate with which polyester preforms for mono-layered and multi-layered packages can be manufactured that do not shorten the life span of the moulds, without significantly reducing the light protection and white appearance.

Yet a further objective of the invention is to provide a concentrate with which mono-layered and multi-layered polyester packages can be manufactured that extent the lifespan of the moulds, without significantly reducing the light protection and white appearance.

Yet a further objective of the invention is to provide a process for preparing a polyester container and preform with which the titanium dioxide content can be lowered, resulting in weight reduction, and lower raw material as well as production costs, without significantly reducing the light protection and white appearance.

The inventors found that one or more of these objectives can, at least in part, be met by lowering the titanium dioxide content and introducing polymethylpentene in polyester preforms and containers.

Accordingly, in a first aspect of the invention provides a concentrate comprising 20-90% of polymethylpentene, and 10-80% of titanium dioxide, based on total weight of the concentrate.

According to another aspect of the invention, there is provided the use of a concentrate for colouring polyester-based materials, wherein the polyester-based materials comprises one or more selected from the group consisting of aliphatic homopolymer polyesters, aliphatic copolymer polyesters, semi-aromatic copolymer polyesters, semi-aromatic homopolymer polyesters, aromatic copolymer polyesters, and aromatic homopolymer polyesters.

According to another aspect of the invention, there is provided a process for preparing polyester containers suitable for storing solids and/or liquids and having a 0-2% transmission at 550 nm and about 0.30 mm sample thickness, said process comprising producing a preform for said containers from a polyester and a concentrate, and blow moulding the preform into a container.

According to another aspect of the invention, there is provided a container, wherein the amount of polymethylpentene is 5% or less and wherein the amount of titanium dioxide is 8% or less, based on total weight of the container, and/or further comprising an amount of aliphatic polymer such as polyethylene and/or polypropylene, and/or an amount of aromatic polymer such as polystyrene. Suitably, the amount of polymethylpentene is 0.1% or more based on total weight of the container, such as 0.5% or more. Suitably, the amount of titanium dioxide is 0.1% or more based on total weight of the container, such as 0.5% or more.

The invention allows to prepare a concentrate with which polyester preforms and/or containers may be coloured having a lower titanium dioxide content, having a lower weight and lower production costs, yet, without significantly reducing light protection and white appearance.

In accordance with the invention, a concentrate comprising titanium dioxide and polymethylpentene may be prepared with which mono-layered and multi-layered polyester preforms and/or containers can be manufactured having a lower abrasive titanium dioxide content. Due to the lower abrasive titanium dioxide, a possible adverse effect on lifespan of the moulds can be reduced.

The invention provides a concentrate comprising 20-90% of polymethylpentene, and 10-80% of titanium dioxide, based on total weight of the concentrate.

The term "concentrate" as used herein is meant to refer to a substance or composition that can suitably be used in a polymer composition (preferably a thermoplastic polymer composition, such as a polyester). The substance or composition may be prepared by concentrating one or more chemical compounds. The concentrate typically comprises a component which is present in the concentrate at a higher level than intended for the final polymer composition. The concentrate is characterised in that it is easy to dose, and having the advantage that it is possible to add the required amounts of polymethylpentene and titanium dioxide together to a polymer composition without unduly adding separate chemical compounds and/or unwanted other components in large amounts to the polymer composition. The concentrate is intended to be incorporated in a polymer composition, and is not used as a coating on the surface of an article. Typically, the concentrate can be characterised as an intermediate product, primarily destined for further processing to acquire finished polymer products Such concentrates are well-known in the technical field to influence one or more chemical and/or physical properties (such as transmittance and colour) of a polymer composition. In the art, the term "concentrate" and "masterbatch" are used interchangeably. In particular, 80% or more, such as 90% or more by total weight of the concentrate comprises polymethylpentene and titanium dioxide together, preferably 95% or more, such as 98% or more. At production temperatures, the concentrate may be solid or liquid. Preferably, the concentrate is solid at room temperature, and liquid at production temperature. Furthermore, the concentrate may be mixed with one or more commercially available concentrates.

The concentration of polymethylpentene in the concentrate is 20% to 90%, based on total weight of the concentrate. Preferably, the polymethylpentene (PMP) content may be 30% to 50%, based on total weight of the concentrate. Polymethylpentene weight amounts below 20% by total weight of the concentrate may result in poorly dispersed pigments and processing issues during application of such concentrates in the production of packaging materials, while amounts above 50% by total weight of the concentrate may have a negative effect on the cost effectiveness of the production process.

The concentration titanium dioxide in the composition of the concentrate is 10% to 80%, based on total weight of the concentrate. Preferably, the titanium dioxide content may be from 10% to 70%, based on total weight of the concentrate. More preferably, the titanium dioxide content may be 20-70%, based on total weight of the concentrate. Titanium dioxide may be present in various forms, including ilmenite, rutile, anatase, brookite, akaogiite, metastable phases, high pressure forms or a mixture thereof. Preferably, the titanium dioxide is present as rutile, anatase, or a mixture thereof. Suitable grades of titanium dioxide are for example commercially available from companies like DuPont, Crystal, and Kronos.

Polymethylpentene may generally be considered a 4-methyl-1-pentene based polyolefin, having the monomeric unit with the chemical formula $(C_6H_{12})_n$. Herein, n is high enough for the polymer to have a number average molecular weight higher than the number average molecular weight of an oligomer, though, not limited hereto. The monomeric unit can homopolymerise and/or copolymerise with linear and/or branched aliphatic and/or aromatic compounds. Suitable examples of comonomers include ethylene, propylene, 1-butene, 1-pentene, 1-hexene, 1-heptane, 1-octene, nonene and 1-decene. Polymethylpentene can for example commercially be obtained from Mitsui Chemicals.

A concentrate may be prepared wherein the polymethylpentene is a homopolymer, copolymer or a mixture thereof. Polymethylpentene typically has a melting point $(T_m)$ of about 220-250° C., such as about 220-240° C.

A concentrate comprising titanium dioxide and polymethylpentene may further comprise one or more light absorbing additives in order to improve the light transmission properties of the final packaging. Light absorbing additives as disclosed herein absorb light in the ultraviolet and/or visible part of the electromagnetic spectrum. As a result, the light absorbing additives contribute to lowering the transmittance of ultraviolet and/or visible light. The one or more light absorbing additives may for example be organic compounds, inorganic compounds, and/or a mixture thereof.

Organic light absorbing additives may, for example, comprise one or more selected from Solvent Yellow 43 (CAS number 19125-99-6/1226-96-9), Solvent Yellow 72 (CAS number 61813-98-7), Solvent Yellow 93 (CAS number 4702-90-3/61969-52-6), Solvent Yellow 114 (CAS number 75216-45-4), Disperse Yellow 64 (CAS number 10319-14-9), Disperse Yellow 201 (CAS number 80748-21-6), Disperse Yellow 241 (CAS number 83249-52-9), Solvent Red 23 (CAS number 85-86-9), Solvent Red 26 (4 477-79-6), Solvent Red 111 (CAS number 82-38-2), Solvent Red 135 (CAS number 71902-17-5), Solvent Red 149 (CAS number 71902-18-6/21295-57-8), Solvent Red 179 (CAS number 89106-94-5), Solvent Red 195 (CAS number 164251-88-1), Solvent Red 207 (CAS number 15958-68-6), Solvent Green 3 (CAS number 128-80-3), Solvent Green 28 (CAS number 71839-01-5), Disperse Blue 60 (CAS number 12217-80-0), Solvent Blue 36 (CAS number 14233-37-5), Solvent Blue 97 (CAS number 61969-44-6), Solvent Blue 101 (CAS number 6737-68-4), Solvent Blue 104 (CAS number 116-75-6), Solvent Orange 60 (CAS number 61969-47-9/6925-69-5), Disperse Orange 47 (CAS number 12236-03-2) and Solvent Black 7 (CI number 50415:1; CAS number 8005-02-5). Suitable organic light absorbing additives are for example commercially available from companies like Milliken.

Inorganic light absorbing additives that may reduce the transmission of the portion of UV and visible light may comprise one or more metal oxides comprising metals consisting from the group of Ni, Fe, Mn, Ti, Co, Cr, Cu, Sn, and Sb. Furthermore, pigments consisting from the group of Pigment Black 11 (CI number 77499; CAS number 12227-89-3), Pigment Black 12 (CI number 77543; CAS number 68187-02-0), Pigment Black 28 (CI number 77428; CAS number 68186-91-4), Pigment Black 30 (CI number 77504; CAS number 71631-15-7) and mixtures thereof may be present in the concentrate to improve the light protection property. The pigments are for example commercially available from companies like The Shepherd Color Company. Examples of other light absorbing additives may be aluminium powder, graphitic carbon, and carbon black.

The above-mentioned one or more light absorbing additives may be present in the concentrate in an amount of up to 10%, based on total weight of the concentrate. The preferred amount in which the one or more light absorbing additives may be present in the concentrate may be 9% or less by total weight of the concentrate, such as 8% or less, 7% or less, 6% or less, 5% or less, 4% or less, 3% or less, 2% or less, or 1% or less. Most preferably, the amount of light absorbing additives is in the range of 0-1% by total weight of the concentrate. Preferably, the amount of light absorbing additives is 0.005% or more by total weight of the concentrate. When the amount of light absorbing additives is above 10% by total weight of the concentrate, the cost effectiveness may be negatively impacted, and/or less ideal properties are acquired. An amount of less than 3% by total weight of the concentrate, may improve the light transmission property of the final packaging.

A concentrate comprising titanium dioxide and polymethylpentene may further comprise one or more aliphatic polymers (viz. other than polymethylpentene). Examples of such aliphatic polymers may be polyethylene and polypropylene. Adding an aliphatic polymer to the concentrate may reduce the cost per weight product, while negatively influencing light protection to a minor extent. An aliphatic polymer may be present in the concentrate in an amount without significantly influencing the transmission property nor the specific colour nor other desired properties. The amount of aliphatic polymer in the concentrate may be 1% or more, based on total weight of the concentrate, such as 10% or more. The amount of the aliphatic polymer in the concentrate may be 80% or less, based on total weight of the concentrate, such as 50% or less, or 30% or less. When the amount of aliphatic polymer is more than 80% by total weight of the concentrate, the concentrate may not contribute sufficiently to the light protection property of preform and/or container. A very small amount of aliphatic polymer in the concentrate may not sufficiently result in added value of incorporating aliphatic polymer in the concentrate. When the amount of aliphatic polymer in the concentrate is 30% or less by total weight of the concentrate, the concentrate may still comprise sufficient amounts of titanium dioxide and polymethylpentene.

A concentrate comprising titanium dioxide and polymethylpentene may further comprise one or more aromatic polymers, in particular aromatic polymers other than polyesters. An example of such aromatic polymer may be polystyrene. Adding an aromatic polymer to the concentrate may reduce the cost per weight product, while negatively influencing light protection to a minor extent. The aromatic polymer may be present in the concentrate in an amount without significantly influencing the transmission property nor the specific colour nor other desired properties. The amount of aromatic polymer in the concentrate may be 1% or more, based on total weight of the concentrate, such as 10% or more. The amount of the aromatic polymer in the concentrate may be 80% or less, based on total weight of the concentrate, such as 50% or less, or 30% or less. When the amount of aromatic polymer is more than 80% by total weight of the concentrate, the concentrate may not contribute sufficiently to the light protection property of preform and/or container. A very small concentration of aromatic polymer in the concentrate may not sufficiently result in added value of incorporating aromatic polymer in the concentrate. When the concentration of aromatic polymer in the concentrate is 30% or less by total weight of the concentrate, the concentrate may still comprise sufficient amounts of titanium dioxide and polymethylpentene.

A concentrate comprising titanium dioxide and polymethylpentene may further comprise a polyester. The polyester may be selected from the group consisting of aliphatic homopolymer polyesters, aliphatic copolymer polyesters, semi-aromatic copolymer polyesters, semi-aromatic homopolymer polyesters, aromatic copolymer polyesters, and aromatic homopolymer polyesters. Adding polyester to the concentrate may decrease the cost per product weight, while negatively influencing transmission to a minor extent. The amount of polyester in the concentrate may be 1% or more, based on total weight of the concentrate, such as 10% or more. The amount of polyester in concentrate may be 80% or less, based on total weight of the concentrate, such as 50% or less, or 30% or less. When the amount of polyester is more than 80% by total weight of the concentrate, the concentrate may not contribute sufficiently to the light protection property of preform and/or container. Preferably, the amount of polyester may range from 1% to 30% by total weight of the concentrate. A very small amount of polyester in the concentrate may not sufficiently result in added value of incorporating polyester in the concentrate. When the concentration of polyester in the concentrate is 30% or less by total weight of the concentrate, the concentrate may still comprise sufficient amounts of titanium dioxide and polymethylpentene.

Preferably, the total amount of aliphatic polymer, aromatic polymer and polyester together in the concentrate is in the range of 1-80% by total weight of the concentrate, such as 5-50%, or 10-30%.

Suitable polyesters include a condensation product of a diprotic acid and a glycol, such as a condensation product of i) a dicarboxylic acid or an anhydride and ii) a glycol. Typically, the diprotic acid comprises an aromatic diprotic acid, or ester or anhydride thereof, such as isophthalic acid, terephthalic acid, naphthalene-1,4-dicarboxylic acid, naphthalene-2,6-dicarboxylic acid, phthalic acid, phthalic anhydride, tetrahydrophthalic anhydride, trimetallitic anhydride, diphenoxyethane-4,4'-dicarboxylic acid, diphenyl-4,4'-dicarboxylic acid, and mixtures thereof. The diprotic acid also can be an aliphatic diprotic acid or anhydride, such as adipic acid, sebacic acid, decane-1,10-dicarboxylic acid, fumaric acid, succinic anhydride, succinic acid, cyclohexanediacetic acid, glutaric acid, azeleic acid, and mixtures thereof. Other aromatic and aliphatic diprotic acids known to the person skilled in the art can as well be used. Preferably, the diprotic acid comprises an aromatic diprotic acid, optionally further comprises 20% or less, by weight of the diprotic acid component, of an aliphatic diprotic acid.

The glycol, or diol, component of the polyester comprises ethylene, glycol, propylene glycol, butane-1,4-diol, diethylene glycol, a polyethylene glycol, a polypropylene glycol, neopentyl glycol, a polytetramethylene glycol, 1,6-xylene glycol, pentane-1,5-diol, 3-methylpentanediol-(2,4), 2-methylpantanediol-(1,4), 2,2,4-trimethylpentanediol-(1, 3), 2-ethylhexanediol-(1,3), 2,2-diethylpropanediol-(1,3), hexanediol-(1,3), 1,4-di-(hydroxyethoxy)benzene, 2,2-bis(4-hydroxycyclohexyl)propane, 2,4-dihydroxy-1,1,3,3-tetramethylcyclobutane, 2,2-bis(3-hydroxyethoxyphenyl)propane, 2,2-bis(4-hydroxypropoxyphenyl)propane, 1,4-dihydroxymethylcyclohexane, and mixtures thereof. Additional glycols known to the person skilled in the art can as well be used as the glycol component of the diluent polyester.

The polyester preferably comprises PET, and for example, virgin bottle grade PET or recycled PET (r-PET), cyclohexane dimethanol/PET copolymer (PETG), polyethylene naphthalate (PEN), polyethylene furanoate (PEF), polybutylene terephthalate (PBT), and mixtures thereof. Suitable polyesters can as well include polymer linkages, side chains, and end groups different from the formal precursors of the simple polyesters previously specified.

The suitable polyesters typically have an intrinsic viscosity of 0.2 or more to 1.2 or less at 25° C., and more preferably 0.6 or more to 0.9 or less, for an average 60/40 blend of phenol/1,1,2,2-tetrachloroethane solvent mixture. In the case of PET, an intrinsic viscosity value of 0.6 at 25° C. may correspond to a viscosity average molecular weight of 36 kDa, and an intrinsic viscosity value of 1.2 may correspond to a viscosity average molecular weight of 103 kDa. Intrinsic viscosity as disclosed herein is determined according to ASTM D4603, Standardised Test Method for Determining Inherent Viscosity of PET. Other methods to determine viscosity of polyesters like using capillary rheometry are also possible and commonly known to the person skilled in the art.

A concentrate comprising titanium dioxide and polymethylpentene may further comprise polyester and/or aliphatic and/or aromatic polymer.

The concentrate may optionally include additives that do not adversely affect the desired properties of the preforms or containers prepared therefrom. The optional additives include, but are not limited to, stabilisers, antioxidants, visible light screening agents, UV light screening agents, extrusion aids, drying agents, fillers, anti-clogging agents, crystallisation aids, impact modifiers, additives designed to make the polymer more (bio-)degradable or combustible, and mixtures thereof. The preferred optional additives may be used in an amount to provide a specific colour and/or to enhance the light protection of the preforms and/or containers prepared therefrom. The optional additives may be present in the concentrate in an amount neither adversely influencing the transmission property nor the specific colour nor other said desired properties.

The polymeric material may comprise any compound constituted of repeating monomeric units. Herewith, the repetition is high enough for the polymer to have a number average molecular weight higher than the number average molecular weight of an oligomer, though, not limited hereto. The monomeric unit can homopolymerise and/or copolymerise with linear and/or branched aliphatic and/or aromatic compounds. In particular, polyester is preferred. The polyester may not necessarily be similar to the polyester species that may be present in the concentrate. The polyester may comprise one or more selected from the group consisting of aliphatic homopolymer polyesters, aliphatic copolymer polyesters, semi-aromatic copolymer polyesters, semi-aromatic homopolymer polyesters, aromatic copolymer polyesters, and aromatic homopolymer polyesters, though, not limited hereto. In particular, PET, PETG, PBT, PEF, and/or PEN may be selected.

A concentrate may be prepared at a temperature whereby the titanium dioxide can be dispersed in the continuous phase. Herewith, the continuous phase may be the polymethylpentene if the concentrate does not further comprise one or more polyesters, aliphatic polymers and/or one or more aromatic polymers. The temperature of the continuous phase may approach or surpass the melting point of the continuous phase. The molten concentrate may be cooled to below solidification temperature when the titanium dioxide may be dispersed in the medium, resulting in a solid concentrate. When the titanium dioxide may not be properly dispersed, homogenised, it may affect the effect of the concentrate in the final application. For example, light protection of the final packaging may be negatively influenced.

In accordance with the invention, also a compound formulation comprising titanium dioxide and polymethylpentene may be prepared with which mono-layered and multi-layered polyester preforms and/or containers can be manufactured having a lower abrasive titanium dioxide content that do not shorten the lifespan of the moulds.

The term "compound formulation" as used in this context is meant to refer to a formulation wherein powders are compounded with one or more other ingredients, in particular a resin, e.g. polyester. Such a formulation can be directly used to prepare a preform. The term "compound formulation" differs from the term "concentrate" in that the compound formulation comprises a significantly higher concentration resin. Some illustrative examples of such resins include polyester resins as described herein. Further additives may be present as well.

The compound formulation may comprise 75-98.5% by total weight of the compound formulation of resin, such as 85-97%.

The compound formulation may comprise 1-5% of polymethylpentene, and 0.5-15% of titanium dioxide, based on total weight of the compound formulation.

The compound formulation may comprise 1-10% of polymethylpentene, based on total weight of the compound formulation. Preferably, the polymethylpentene (PMP) content is 1% to 5%, based on total weight of the compound formulation.

The compound formulation may comprise 15% or less by total weight of the compound formulation of titanium dioxide. The preferred amount at which the titanium dioxide may be present in the compound formulation is 14% or less by total weight of the compound, such as 13% or less, 12% or less, 11% or less, 10% or less, 9% or less, 8% or less, 7% or less, 6% or less, 5% or less, 4% or less, 3% or less, 2% or less, or 1% or less. Preferably, the compound formulation comprises 0.5% or more by total weight of the compound formulation of titanium dioxide. In particular, the amount of titanium dioxide may be from 0% to 10%, based on total weight of the compound formulation. The most preferred amount of titanium dioxide is from 2% to 8%, based on total weight of the compound formulation.

A concentrate may be used for colouring polyester-based materials, including fabrics, fibres, preforms, films, canoes, displays, holograms, filters, insulation, vehicles, instruments, and packaging, though, not limited hereto. In particular, preforms for bottles, bottles, and other containers are preferred.

A concentrate may be used in a preform for containers. Such a preform may comprise an amount of polymethylpentene of 10% or less by total weight of the preform. The preferred amount at which polymethylpentene may be present in the preform is 9% or less by total weight of the preform, such as 8% or less, 7% or less, 6% or less, 5% or less, 4% or less, 3% or less, 2% or less, or 1% or less. Preferably, polymethylpentene is present in an amount of 0.5% or more by total weight of the preform. The most preferred amount of polymethylpentene is from 1% to 5% by total weight of the preform. When the amount of polymethylpentene is below 1% by total weight of the preform, light transmittance of the preform may be too high, while above 5% by total weight of the preform, the physical properties of the preform may be negatively influenced.

The preform for containers may comprise an amount of titanium dioxide of 15% or less by total weight of the preform. The preferred amount at which titanium dioxide is present in the preform is 14% or less by total weight of the preform, such as 13% or less, 12% or less, 11% or less, 10% or less, 9% or less, 8% or less, 7% or less, 6% or less, 5% or less, 4% or less, 3% or less, 2% or less, or 1% or less. Preferably, titanium dioxide is present in an amount of 0.5% or more by total weight of the preform. The most preferred amount of titanium dioxide is from 0 to 8% by total weight of the preform. When the amount of titanium dioxide is above 15% by total weight of the preform, physical properties of the preform may be negatively influenced. For example, blowing of a preform and mechanical properties of both the container as well as the polymer may be hampered. When the amount of titanium dioxide is above 4% by total weight of the preform, multi-layered structures may not be necessary to obtain desired light protection for containers.

When titanium dioxide is absent in the preform, the light-shielding property is negatively influenced and higher amounts of for example polymethylpentene are needed resulting in higher costs and subsequently less ideal properties.

The concentrate as described herein may be used for colouring polyester. The compound formulation according to the invention may be used for colouring polyester. In other words, the concentrate or the compound formulation may be used for preparing coloured polyester. Herewith, the concentrate or the compound formulation is brought into contact with polyester, resulting in coloured polyester. The polyester is a polyester preform for bottles or other containers. The polyester preform for bottles or other containers comprises an amount of polymethylpentene of 5% or less and/or an amount of titanium dioxide of 8% or less by total weight of the polyester preform or other containers.

The invention is also directed to the process of preparing containers suitable for storing solids and/or liquids, wherein said process comprises producing a preform for said containers. Herewith, the containers may comprise one or more polymeric materials. In particular, polyester is preferred. The polyester may not necessarily be identical to the above polyester which may be added to the concentrate and/or the preform. The preform for the containers may comprise a polyester and a concentrate. The containers may be prepared by moulding, in particular blow moulding, such as extrusion blow moulding, one stage injection stretch blow moulding or two stage injection stretch blow moulding.

The prepared containers may have 4% or less transmission, measured at a wavelength of 550 nm and having an average wall thickness of 0.3 mm. Preferably, the prepared containers have 4% or less transmission at a wavelength range from 200 to 750 nm and having an average wall thickness of 0.3 mm. In the context of this invention, this means that over the entire 200-750 nm spectrum the transmission does not exceed 4%. The preferred percent transmission may be 1% or less, 2% or less, or 3% or less. In particular, the transmission may be 0 to 2%, measured at a wavelength of about 550 nm and an average wall thickness of 0.3 mm. The most preferred transmission may be 0 to 0.5%, measured at a wavelength of about 550 nm and an average wall thickness of 0.3 mm. As described by Beer's law, samples with larger average wall thickness may have greater opacity.

A container may be prepared wherein the amount of concentrate is 15% or less by total weight of the container. The preferred amount at which the concentrate is present in the container is 14% or less by total weight of the container, such as 13% or less, 12% or less, 11% or less, 10% or less, 9% or less, 8% or less, 7% or less, 6% or less, 5% or less, 4% or less, 3% or less, 2% or less, or 1% or less. Preferably, the concentrate is present in an amount of 0.5% or more by total weight of the container. In particular, the amount of concentrate may be from 2% to 15%, based on total weight of the container. The most preferred amount of concentrate is from 4% to 10%, based on total weight of the container. An amount of lower than 2% by total weight of the container may result in a too low amount of polymethylpentene and titanium dioxide in the container, which negatively influences the light-shielding property, based on a container with an average wall thickness of 0.3 mm. Amounts above 15% by total weight of the container may result in too much polymethylpentene and titanium dioxide in the container, which may negatively influence the physical properties of the container.

The invention is also directed to containers that may be obtained by using the concentrate or the preform of the invention, and/or by performing the process of preparing containers of the invention.

A container may comprise an amount of polymethylpentene of 10% or less by total weight of the container. The preferred amount at which the polymethylpentene may be present in the container is 9% or less by total weight of the container, such as 8% or less, 7% or less, 6% or less, 5% or less, 4% or less, 3% or less, 2% or less, or 1% or less. Preferably, polymethylpentene is present in an amount of 0.5% or more by total weight of the container. In particular, the amount of polymethylpentene may be from 0% to 6%, based on total weight of the container. The most preferred amount of polymethylpentene is from 1% to 5%, based on total weight of the container. An amount of polymethylpentene below 1% by total weight of the container may result in a too high light transmittance of the preform, based on a container with an average wall thickness of 0.3 mm. When the amount of polymethylpentene is above 5% by total weight of the container, physical properties of the container may be negatively influenced.

A container may comprise an amount of titanium dioxide of 15% or less by total weight of the container. The preferred amount at which the titanium dioxide may be present in the container is 14% or less by total weight of the container, such as 13% or less, 12% or less, 11% or less, 10% or less, 9% or less, 8% or less, 7% or less, 6% or less, 5% or less, 4% or less, 3% or less, 2% or less, or 1% or less. Preferably, titanium dioxide is present in an amount of 0.5% or more by total weight of the container. In particular, the amount of titanium dioxide may be from 0% to 10%, based on total weight of the container. The most preferred amount of titanium dioxide is from 2% to 8%, based on total weight of the container. An amount of titanium dioxide above 8% by total weight of the container may adversely influence physical properties of the container. The blowing of a preform and the mechanical properties of both the container as well as the polymer may be negatively influenced.

A container may comprise polymeric material which may comprise any compound constituted of repeating monomeric units. Herewith, the repetition is high enough for the polymer to have a number average molecular weight higher than the number average molecular weight of an oligomer, though, not limited hereto. The monomeric unit can homopolymerise and/or copolymerise with linear and/or branched aliphatic and/or aromatic compounds. In particular, polyester is preferred. The polyester may not necessarily be similar to the polyester species that may be present in the concentrate. The polyester may comprise one or more selected from the group consisting of aliphatic homopolymer polyesters, aliphatic copolymer polyesters, semi-aromatic copolymer polyesters, semi-aromatic homopolymer polyesters, aromatic copolymer polyesters, and aromatic homopolymer polyesters, though, not limited hereto. In particular, PET, recycled PET, PETG, PBT, PEF, and/or PEN may be selected. Suitable polyesters can as well include polymer linkages, side chains, and end groups different from the formal precursors of the simple polyesters previously specified.

A container may further comprise one or more previously described aliphatic polymers and/or aromatic polymers. Preferably, the aliphatic polymer(s) and/or aromatic polymer(s) may not be similar to the aliphatic and/or aromatic polymer(s) present in the concentrate. Accordingly, if the container comprises such further aliphatic polymers, then these further aliphatic polymers are preferably aliphatic polymers other than polymethylpentene. Likewise, if the container comprises such further aromatic polymers, then these further aromatic polymers are preferably aromatic polymers other than polyesters.

A container may comprise an amount of 40% or less of such aliphatic polymer, by total weight of the container. Preferably, the amount of aliphatic polymer is 5% or less, based on total weight of the container. Most preferred, an aliphatic polymer (other than polymethylpentene) is not present in the container.

A container may comprise an amount of 40% or less of such aromatic polymer (in particular an aromatic polymer other than polyester), by total weight of the container. Preferably, the amount of aromatic polymer is 5% or less, based on total weight of the container. Most preferred, an aromatic polymer (other than aromatic polyester) is not present in the container.

The invention has been described by reference to various embodiments, and methods. The skilled person understands that features of various embodiments and methods can be combined with each other.

All references cited herein are hereby completely incorporated by reference to the same extent as if each reference were individually and specifically indicated to be incorporated by reference and were set forth in its entirety herein.

The use of the terms "a" and "an" and "the" and similar referents in the context of describing the invention (especially in the context of the claims) are to be construed to cover both the singular and the plural, unless otherwise indicated herein or clearly contradicted by context. The terms "comprising", "having", "including" and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. For the purpose of the description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Preferred embodiments of this invention are described herein. Variation of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject-matter recited in the claims appended hereto as permitted by applicable law. Moreover, any combination of the above-described elements in all possible variations thereof is encompassed by the invention unless otherwise indicated herein or otherwise clearly contradicted by context. The claims are to be construed to include alternative embodiments to the extent permitted by the prior art.

For the purpose of clarity and a concise description features are described herein as part of the same or separate embodiments, however, it will be appreciated that the scope of the invention may include embodiments having combinations of all or some of the features described.

Hereinafter, the invention will be illustrated in more detail, according to specific examples. However, the invention may be embodied in many different forms and should not be construed as being limited to the embodiments set forth herein. Rather, these example embodiments are provided so that this description will be thorough and complete, and will fully convey the scope of the invention to those skilled in the art.

EXAMPLES

Example 1

PET bottles were prepared including amounts of 1 wt. % and 3 wt. % of selected polymers. These polymers were Moplen HP500N (homopolymer of polypropylene from LyondellBasell Industries), polymethylpentene (from Mitsui), Hostalen XP112-I (random copolymer polypropylene from LyondellBasell Industries), LLDPE 1050B (linear low-density polyethylene from Dow Chemical Company), Polybutene-1 PB 0800M (homopolymer of polybutene-1 from LyondellBasell Industries), PLEXIGLAS® 8N (polymethylmethacrylate (PMMA) from Evonik Industries) and Vistamaxx 6202 FL (from Exxon Mobil). The polyester preforms (Invista T94N PET resin (IV=0.84 dl/g)), 25 g preform for 0.5 litre bottle with PCO neck finish) were made on an Arburg Allrounder 320 (extruder temperature profile, hot runner temperatures were set at 285° C.), equipped with a Piovan T200 dryer and DB-60 control unit (PET was dried to a dew point of −45° C.). Dosing of the polymer into the PET base resin was done using a Movacolor MCBalance. Some polymers could not be processed at 3 wt. % and were excluded from further work. Preforms were blown on a Corpoplast LB01 using standard PET bottle blowing settings. The transmission curves from 200 to 750 nm of the blown bottles (0.30 mm wall thickness) were collected using a Cary 5000 spectrometer equipped with an integrating sphere. The percent transmission at 550 nm was determined from the transmission curves and is shown in FIG. 1. As can be seen, the amount of light transmitted using the polymer polymethylpentene is significantly lower, at the critical wavelength of below 550 nm and below, than with the selected standards at the concentration of 1% and 3%.

Example 2

A mixture of 800 gram polymer and 1200 gram titanium dioxide was mixed and processed on a laboratory extruder (APV 19 mm twin screw) with a temperature profile between 270 and 240° C. at 300 rpm. The percent of polymer by weight included in the concentrate is 40%, the weight of titanium dioxide included in the concentrate is 60%.

Several concentrates were prepared as described above, with selected carrier polymers. The concentrates containing these polymers were used to prepare polyester preforms and bottles.

Figure 2:
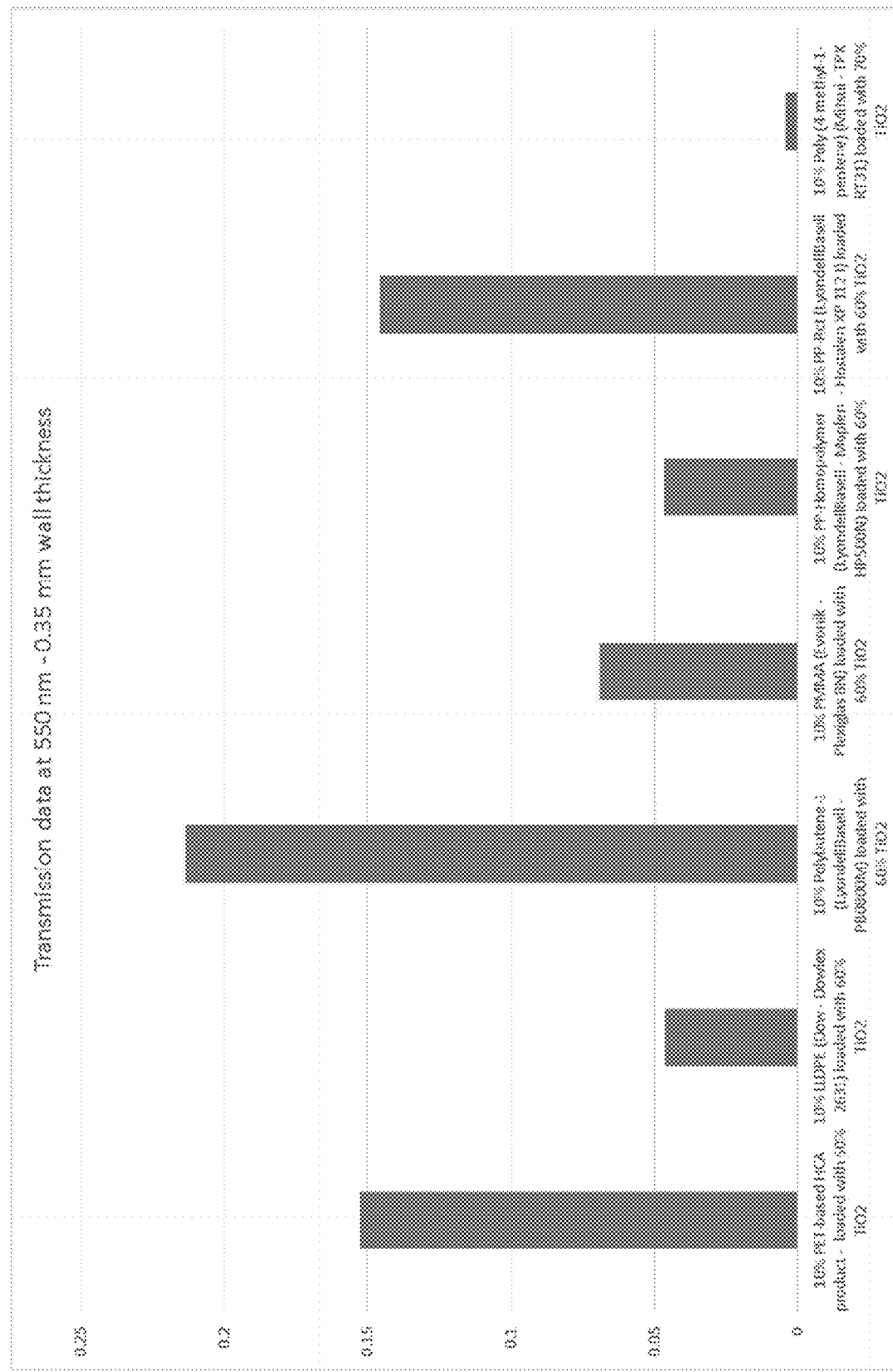
FIG. 2 depicts the percent transmission at 550 nm of several polymers—0.35 mm wall thickness.

The colour concentrates were used to produce polyester (PET) preforms (Invista T94N resin (IV=0.84 dl/g)), 25 g preform for 0.5 litre bottle with PCO neck finish) on an Arburg Allrounder 320 (extruder temperature profile, hot runner temperatures were set at 285° C.), equipped with a Piovan T200 dryer and DB-60 control unit (PET was dried to a dew point of −45° C.). Dosing of the colour concentrates at 9 wt. % was done using a Movacolor MCBalance. Preforms were blown on a Corpoplast LB01 using standard PET bottle blowing settings. The transmission curves from 200 to 750 nm of the blown bottles were collected using a Cary 5000 equipped with an integrating sphere. The percent transmission at 550 nm was determined from the transmission curves and is shown in FIG. 2.

Example 3

Two additional colour concentrates were made in the following manner:

A mixture of 700 g polymer, 1300 g titanium dioxide was mixed and processed on a laboratory extruder (APV 19 mm twin screw) and temperature profile between 270 and 240° C. at 300 rpm. The chosen carrier polymers were PET and polymethylpentene. The percent of carrier polymer by weight included in the concentrate is 35%, the weight of titanium dioxide included in the concentrate is 65%

These concentrates with polymethylpentene and PET as carrier polymers were used to prepare polyester preforms and bottles as described in Example 2.

Figure 3:
FIG. 3 depicts the percent TiO2 in final product for transmission at 550 nm of several polymers—0.30 mm wall thickness, 1.5% transmission.

As can be seen from FIG. 3, the amount of titanium dioxide in the bottles to achieve a light transmission at 550 nm of 1.5% in these bottles was remarkably lower for the claimed invention.

Example 4

A mixture of 700 g polymer, 1299 g titanium dioxide and 1 g Carbon Black Pigment Black 7 (PB7) was mixed and processed on a laboratory extruder (APV 19 mm twin screw) and temperature profile between 270 and 240° C. at 300 rpm. The chosen carrier polymers were PET and polymethylpentene. The percent of carrier polymer by weight included in the concentrate is 35%, the weight of titanium dioxide included in the concentrate is 64.94%, the weight of PB7 was 0.06%.

These concentrates with polymethylpentene and PET as carrier polymers were used to prepare polyester preforms and bottles as described in Example 2, with the difference that bottles were prepared with a wall thickness of 0.2 mm.

Figure 4:
FIG. 4 depicts the percent TiO2 in final product for transmission at 550 nm of several polymers—0.20 mm wall thickness, 0.22% transmission.

As can be seen from FIG. 4, the amount of titanium dioxide in the bottles to achieve a light transmission at 550 nm of 0.2% in these bottles was remarkably lower for the claimed invention.

The invention claimed is:

1. A method of colouring polyester, comprising adding a concentrate to the polyester, wherein the concentrate comprises 98% or more by weight of polymethylpentene and titanium dioxide, based on total weight of the concentrate.

2. The method of claim 1, wherein the polymethylpentene is a homopolymer, copolymer or a mixture thereof.

3. The method of claim 1, wherein the concentrate further comprises polyester.

4. The method of claim 1, wherein the concentrate further comprises aliphatic polymer or aromatic polymer.

5. The method of claim 3, wherein the polyester comprises one or more selected from the group consisting of aliphatic homopolymer polyesters, aliphatic copolymer polyesters, semi-aromatic copolymer polyesters, semi-aromatic homopolymer polyesters, aromatic copolymer polyesters, and aromatic homopolymer polyesters.

6. The method of claim 4, wherein the aromatic polymer comprises one or more selected from the group consisting of polystyrene, polysulphone, polyphenylsulphone, and acrylonitrile-butadiene-styrene, and the aliphatic polymer comprises one or more selected from the group consisting of polyethylene, and polypropylene.

7. The method of claim 1, wherein the concentrate further comprises a light absorbing additive.

8. The method of claim 7, wherein the light absorbing additive is a pigment and/or dye.

9. A compound formulation comprising a polymethylpentene, titanium dioxide, and a polyester resin, wherein the compound formulation comprises 1-10% of polymethylpentene and 0.5-15% of titanium dioxide, based on total weight of the compound formulation.

10. A method of colouring polyester, comprising adding the compound formulation of claim 9 to the polyester.

11. The method of claim 1, wherein the polyester is a polyester preform for bottles or other containers.

12. The method of claim 11, wherein the amount of polymethylpentene is 5% or less by total weight of the preform.

13. The method of claim 11, wherein the amount of titanium dioxide is 8% or less by total weight of the preform.

14. A process for preparing polyester-based containers suitable for storing solids and/or liquids and having a 0-2% transmission at 550 nm and 0.3 mm sample thickness, said process comprising colouring a polyester according to the method of claim 1, and producing a preform for said containers from the coloured polyester and moulding the preform into a container.

15. A process for preparing polyester-based containers suitable for storing solids and/or liquids and having a 0-2% transmission at 550 nm and 0.3 mm sample thickness, said process comprising producing a preform for said containers from the polyester and the compound formulation of claim 9, and moulding the preform into a container.

16. The process of claim 14, wherein the amount of concentrate is 4-8% by total weight of the polyester-based container.

17. A container product obtainable by the process of claim 14, wherein the amount of polymethylpentene is 5% or less by total weight of the container.

18. A container product obtainable by the process of claim 14, wherein the amount of titanium dioxide is 8% or less by total weight of the container.

19. The method of claim 10, wherein the polyester is a polyester preform for bottles or other containers.

20. The method of claim 19, wherein the amount of polymethylpentene is 5% or less by total weight of the preform.

21. The method of claim 19, wherein the amount of titanium dioxide is 8% or less by total weight of the preform.

* * * * *